United States Patent
Bartminn et al.

(10) Patent No.: US 12,024,846 B2
(45) Date of Patent: Jul. 2, 2024

(54) METHOD FOR ASSESSING THE AXIAL LOAD BEARING CAPACITY OF AN INSTALLED PILE

(71) Applicants: Daniel Bartminn, Elmshorn (DE); Volker Herwig, Hamburg (DE); Benjamin Matlock, Hamburg (DE)

(72) Inventors: Daniel Bartminn, Elmshorn (DE); Volker Herwig, Hamburg (DE); Benjamin Matlock, Hamburg (DE)

(73) Assignee: RWE Offshore Wind GmbH, Essen (DE)

( * ) Notice: Subject to any disclaimer, the term of this patent is extended or adjusted under 35 U.S.C. 154(b) by 0 days.

(21) Appl. No.: 18/481,386

(22) Filed: Oct. 5, 2023

(65) Prior Publication Data
US 2024/0035248 A1    Feb. 1, 2024

Related U.S. Application Data

(63) Continuation of application No. PCT/EP2022/056252, filed on Mar. 10, 2022.

(30) Foreign Application Priority Data

Apr. 8, 2021   (DE) .................. 10 2021 108 780.5

(51) Int. Cl.
  *G01N 3/32*    (2006.01)
  *E02D 7/18*    (2006.01)
  *E02D 33/00*   (2006.01)
  *G01M 5/00*    (2006.01)

(52) U.S. Cl.
  CPC .............. *E02D 33/00* (2013.01); *E02D 7/18* (2013.01); *G01N 3/32* (2013.01); *G01N 2203/0007* (2013.01); *G01N 2203/0676* (2013.01)

(58) Field of Classification Search
  CPC .......... E02D 13/005; E02D 7/02; E02D 5/34; E02D 7/20; E02D 7/12; E02D 27/12; E02D 13/00; G01N 3/34; G01N 29/043; G01N 3/32; G01N 2203/0007; G01N 2203/0676
  See application file for complete search history.

(56) References Cited

U.S. PATENT DOCUMENTS

| 5,172,587 | A | 12/1992 | Long | |
| 9,689,136 | B2 * | 6/2017 | Dinh | ........................ E02D 33/00 |
| 2007/0283765 | A1 * | 12/2007 | Deuar | ................. G01M 5/0058 |
| | | | | 73/849 |
| 2013/0086974 | A1 * | 4/2013 | Rausche | ............. G01M 5/0058 |
| | | | | 73/12.01 |

FOREIGN PATENT DOCUMENTS

| DE | 102006060643 A1 | 8/2008 |
| JP | H0517943 A | 1/1993 |

* cited by examiner

*Primary Examiner* — Brandi N Hopkins
(74) *Attorney, Agent, or Firm* — Reinhart Boerner Van Deuren P.C.

(57) ABSTRACT

The application relates to a method for assessing the load bearing capacity of an inserted pile, including: applying, by a vibrator device arranged at the inserted pile, the inserted pile with a measuring pulse string during at least one vibration time period, detecting, by at least one detection module, motion data of the inserted pile caused by the measuring pulse string during a measuring time period, determining at least one downward motion data set from the detected motion data; and evaluating the downward motion data set such that a load bearing capacity criterion is determined.

20 Claims, 5 Drawing Sheets

METHOD FOR ASSESSING THE AXIAL LOAD BEARING CAPACITY OF AN INSTALLED PILE

CROSS-REFERENCE TO RELATED PATENT APPLICATIONS

This patent application is a continuation of International Application No. PCT/EP2022/056252, filed on Mar. 10, 2022, which claims the benefit of priority to German Patent Application No. 102021108780.5, filed Apr. 8, 2021, the entire teachings and disclosures of both applications are incorporated herein by reference thereto.

BACKGROUND OF THE INVENTION

The application relates to a method for assessing the axial load bearing capacity of an inserted pile. In addition, the application relates to a measuring system, a computer program product, a measuring set and a vibrator device.

SUMMARY OF THE INVENTION

Wind farms are increasingly being built in offshore areas to generate electrical energy. The advantages of offshore locations are the higher wind probability and the higher average wind strengths. This results—in particular compared to onshore locations—in a higher electrical energy yield of a wind farm built in an offshore area.

An offshore wind farm typically comprises a plurality of offshore structures, such as a plurality of offshore wind turbines, at least one offshore substation, and/or at least one offshore met mast.

Such offshore structures, but also other onshore structures and offshore structures (e.g., oil drilling platforms or the like), are usually founded with at least one pile on or in the underwater bottom. When installing an offshore structure, at least one pile is first inserted respectively driven into the underwater soil at the desired installation site.

In the prior art, a pile is driven by a percussion hammer and/or by a vibrator device. Impact pulses are applied to the head of the pile by a percussion hammer, also known as a pile hammer, in order to drive the pile to a desired anchoring depth. A vibrator device transfers pulse strings and vibrations/oscillations, respectively, to a pile. The pulse strings transferred to the pile yield to a liquefaction of the underwater soil so that the pile is inserted into the underwater soil.

After an inserting of the pile into an underwater soil, it may generally be necessary to determine the axial load bearing capacity of the inserted pile. In particular, it may be necessary to provide proof that the axial load bearing capacity of the inserted pile is sufficient.

For this purpose, a so-called dynamic test loading is carried out in the prior art, in particular for offshore piles, by means of the percussion hammer. In dynamic test loading, a pile is loaded with a (short) shock pulse by briefly stressing the pile head by the impact of the hammer. The generated impact pulse then travels as an pulse wave and strain wave, respectively, from the pile head to the pile base of the inserted pile. The generated pulse wave is reflected at the pile base and returns to the pile head (in a damped manner).

At least one motion data sensor attached to the pile can detect the reflected pulse wave and strain wave, respectively. The detected motion data can be evaluated using a predefined method (e.g., CAPWAP method) to determine a load bearing capacity criterion. This can then be evaluated using, for example, a predefined verification criterion (e.g., a minimum fixed growth factor) to determine whether or not there is sufficient axial load bearing capacity of the inserted (resp. installed) pile.

A disadvantage of the described prior art is that for the execution of the dynamic test loading, a percussion hammer is always required after the insertion of the pile in order to apply the driving impulse to the pile. This is in particular disadvantageous if a vibrator device is used, since in this case an additional percussion hammer is required following the pile insertion. This increases the effort required for installing piles and, in particular, for providing proof of sufficient (axial) load bearing capacity.

Therefore, the object of the application is to create a possibility that enables a reduction of the effort in the installation of piles and, in particular, in the provision of a proof of sufficient (axial) load bearing capacity.

The object is solved according to a first aspect of the application by a method according to the present disclosure. The method serves for determining, in particular assessing, the (axial) load bearing capacity of an inserted pile. The method comprises:
  applying, by a vibrator device arranged at the inserted pile, the inserted pile with a measuring pulse string during at least one vibration time period,
  detecting, by at least one detection module, of motion data of the inserted pile caused by the measuring pulse string during a measuring time period,
  determining at least one downward motion data set from the detected motion data; and
  evaluating the downward motion data set such that a load bearing capacity criterion is determined.

In contrast to the prior art, the method according to the application uses a vibrator device instead of a percussion hammer, thus enabling a reduction of the effort required for the installation of piles and, in particular, for providing proof of sufficient (axial) load bearing capacity. In particular, according to the application, instead of a driving impact by a percussion hammer, the pile is applied with a measuring pulse string so that a corresponding plurality of pulse waves and strain waves, respectively, is generated, and the resulting motion data is evaluated in such a way that a load bearing capacity of the installed pile can be assessed.

The method according to the application is used to assess whether or not a pile inserted in a soil to a certain anchoring depth has sufficient load bearing capacity, in particular whether or not it has sufficient axial load bearing capacity.

The pile is in particular at least a part of a foundation of a structure. A structure may in particular be formed by the foundation and at least one device to be supported by the foundation.

Preferably, the structure is an offshore structure. Particularly preferably, the offshore structure may be an offshore structure of an offshore wind farm, such as an offshore wind turbine, an offshore substation and/or an offshore measuring mast. Further, an offshore structure may be a drilling or production platform (e.g., oil or gas platform) or other offshore platform, preferably configured to extract, convert, and/or store energy, such as an offshore hydrogen production facility. The offshore structure may comprise the inserted pile.

A foundation of an offshore structure is preferably a monopile, tripod, triple or jacket foundation. By means of such a foundation, an offshore structure can be directly anchored on respectively in the underwater construction ground respectively underwater soil, in particular a seabed.

A pile according to the application means in particular a tower-shaped, in particular cylindrical foundation structure, preferably in the form of a hollow structural element. Such a pile generally comprises a circumferential pile wall extending in the longitudinal direction and axial direction, respectively, wherein the pile wall is bounded on the underside by an underside end face and on the upper side by an upper end face. Here, the indications "upper", "lower", etc., refer to the inserted state of the pile. The upper end of the pile may also be referred to as the pile head, and the lower end of the pile may be referred to as the pile base.

A pile according to the application may be made of a metallic material. Steel is particularly suitable for such a foundation structure due to its strength and stiffness properties. Alternatively or additionally, a pile may be made of a mineral building material. The mineral building material is preferably concrete, which is mixed from cement, gravel, sand and water and is hardened in particular after casting.

Furthermore, a pile according to the application preferably comprises a circular cross-sectional area. In other variants of the application, another cross-sectional area may also be provided, such as an oval-shaped, rectangular-shaped or the like. Preferably, the cross-sectional area remains constant in the longitudinal direction. In other variants, the cross-sectional area may also change, such as tapering toward the base of the pile.

According to the application, a measuring pulse string (also referred to as measuring vibrations) is applied to an inserted pile. According to the application, an inserted pile is in particular a pile that is inserted in the ground at a certain respectively desired anchoring depth. Preferably, the pile may have been vibrated in with a vibrator device. However, the use of another device is also conceivable.

According to the application, a vibrator device is used to apply a measuring pulse string to the pile. In particular, the vibrator device can be force-fitly connected to the pile (preferably the pile head). The vibrator device can be configured to generate measuring vibrations and a measuring pulse string, respectively, in the vertical direction (i.e., in the longitudinal direction of the inserted pile). For example, the vibrator device may comprise an eccentric equipment that can be driven by a drive of the vibrator device. The eccentrics of the eccentric equipment, which are in particular arranged in pairs, can preferably rotate at the same angular velocity, but in opposite directions. The at least two eccentrics can generate centrifugal forces. Here, the horizontal forces can cancel each other, while the vertical components can add up to a total centrifugal force. The impulses and vibrations, respectively, generated by this can be transferred to the pile due to the force-fit connection of the vibrator device with the pile. This generates a plurality of pulse waves and strain waves, respectively.

The applying of the pile with a measuring pulse string takes place during a vibration time period.

During a measuring time period, a detecting of motion data of the pile occurs in the method according to the application. The motion data is caused by the measuring pulse string and the measuring vibrations, respectively. In particular, the motion data of the generated pulse waves respectively strain waves are detected.

The detectable motion data comprise, in particular, force parameter values and/or velocity parameter values. Preferably, the compression (force) and/or the acceleration (velocity and displacement) can be measured at the pile (in particular at the pile head).

Preferably, a measuring device comprising the detection module may comprise at least one motion data sensor and/or be connected to at least one motion data sensor. In a preferred embodiment, the measuring device may comprise and/or be connected to at least one (preferably exactly two) strain sensor(s) and/or at least one (preferably exactly two) acceleration sensor(s). The at least one motion data sensor may be attached to the pile head.

Preferably, the vibration time period comprises the measuring time period, wherein the measuring time period is preferably shorter than the vibration time period. In particular, this means that the measuring time period is within the vibration time period. Preferably, the vibration time period can be composed of a start-up time period, a measuring time period (directly) following it, and in particular a decay time period (directly) following it. The start-up time period and forward stroke phase, respectively, is in particular the time period during which the vibrator device is run up from a frequency 0 to a (certain) minimum measuring frequency from which the aforementioned detection can take place. The decay time period and follow-up phase, respectively, is in particular the time period during which the vibrator device is run down again to frequency 0 after the measuring time period.

Furthermore, according to the application, a determining of at least one downward motion data set is performed from the detected motion data. According to the application, it has been recognized that, in order to be able to assess the load bearing capacity of the inserted pile, it is necessary to identify the pulse wave and strain wave, respectively, generated by the vibrator device by a downward movement (i.e., a movement of the vibrator device in the direction of the pile base) (and in particular reflected at the pile base), i.e., in particular to determine the associated motion data of this pulse wave.

According to the application, the motion data associated with a pulse wave is referred to in particular as downward motion data. Here, a downward motion data set can be assigned to a downward motion respectively to a corresponding pulse wave, i.e., in particular, it can contain only the data of a pulse wave.

In variants of the application the data may also contain data from two or more pulse waves.

According to a preferred embodiment, the determining of the downward motion data set and the corresponding motion parameter values, respectively, may comprise applying a filter function to the detected motion data or motion parameter values.

In particular, the filter function is synchronized respectively coordinated with the vibrator device and the generated measuring pulse string and/or takes into account the pile dimensions (e.g., length of the pile, diameter of the pile, diameter of the pile wall, cross-sectional shape of the pile, etc.). In particular, the filtering by the filtering function is performed in such a manner that the downward motion data caused by a reflection of the at least one pulse wave generated by a downward motion at the pile base is determined from the entirely detected motion data, that is, the motion data of the reflected pulse wave. In other words, the wave data generated by a downward motion of the vibrator device and reflected at the pile base, that is, the corresponding downward motion data set containing, in particular, the compression and acceleration parameter values, are identified by the filter function.

The at least one determined, in particular identified downward motion data set (in a preferred embodiment, a plurality of downward motion data sets can be determined from a corresponding plurality of downward movements) is then evaluated, in particular with regard to the (axial) load bearing capacity of the inserted pile.

The evaluating of the at least one downward motion data set may, according to a preferred embodiment, be performed by means of modeling based on the wave theory, e.g., based on the CAPWAP method, TNOWAVE method, or CASE method (these methods are known to those skilled in the art). For example, a pile-soil model (CAPWAP) can be developed by inverse system identification based on the at least one downward motion data set, from which the static pile resistances (preferably skin friction and/or peak pressure) can then be derived to determine whether there is (or is not) sufficient (axial) load bearing capacity of the inserted pile.

Thus, according to the application, a load bearing capacity criterion can be determined, such as a shell friction criterion and/or peak pressure criterion. In particular, a resistance-settlement line and/or a distribution of pile shell and pile toe resistance can be determined as a load bearing capacity criterion by evaluating the determined motion data.

A verification criterion for a sufficient load bearing capacity of the pile can be, for example, a specified limit load bearing capacity (e.g., limit shell friction and/or limit peak pressure), which must be complied with in order for an inserted pile to be evaluated as a pile with a sufficient (axial) load bearing capacity.

If the criterion is not met, the axial load bearing capacity is insufficient. For example, further measures can then be taken (for example, the pile can be inserted deeper) and, if necessary, the present method can be carried out again.

According to a further embodiment of the method according to the application, the (aforementioned) steps of applying, detecting and determining can be carried out again after a decay time period (and, if necessary, a further (predeterminable) waiting time period). The further waiting time period can also be referred to as a second fixed growth time period, which in particular can be shorter than a first fixed growth time period (described in more detail below).

In particular, this test procedure, i.e., applying, detecting and determining, can be carried out several times, each time interrupted by at least the aforementioned decay time period (and, if necessary, the aforementioned waiting time period). Subsequently, a (joint) evaluation of the respectively determined downward motion data sets can be carried out. A more exact evaluation can be carried out by means of a corresponding test. It shall be understood that also after each test procedure an evaluation can take place.

According to a further embodiment of the method according to the application, the detecting of the motion data (respectively parameter values) (by the measuring device) can be performed with a sampling rate of at least 10,000 values per second, in particular with a sampling rate of at least 40,000 values per second (and, for example, at most 200,000 values per second). This enables a determination, in particular identification, of individual downward movements of the vibrator device and a subsequent determination, in particular identification, (by, for example, the described filter function) of the pulse wave caused by an identified downward movement and reflected at the pile base. In particular, motion data with a sampling rate between 10,000 values per second and 40,000 values per second can be recorded by the measuring transducers and measuring sensors, respectively, and the detection module comprising at least one A/D converter of a data logger (e.g., PDI measuring system).

It has also been recognized that for a reliable assessment of the load bearing capacity of the pile, the pile should not be driven (significantly) deeper into the soil during the measuring time period. According to a preferred embodiment of the method according to the application, it is proposed in particular that a maximum measuring frequency of the measuring pulse string (during the measuring time period) is at least below a (predefined) limit frequency. In particular, the maximum measuring frequency can be selected in such a way that it is ensured that the soil at the installation site does not liquefy. The limit frequency can therefore be a frequency at which the soil does not yet liquefy. Here, the limit frequency can be specified depending on the local soil conditions (e.g., sandy soil or a cohesive soil (e.g., clay soil) at the installation site.

According to a further preferred embodiment of the method according to the application, a maximum measuring frequency of the measuring pulse string (during the measuring time period) can be at most 80% of the (maximum) inserting frequency, preferably at most 60% of the (maximum) inserting frequency, particularly preferably at most 40% of the (maximum) inserting frequency. In particular, the (maximum) inserting frequency means the (maximum) frequency with which the pile is driven to the specified anchoring depth. In other words, the (maximum) inserting frequency means, in particular, the maximum inserting frequency used during the previous inserting of the pile into the specified anchoring depth. It should be noted here that the inserting frequency may depend, in particular, on the type of soil respectively the soil conditions at the installation location of the pile. In a corresponding manner, the maximum measuring frequency can then depend on the soil type.

Furthermore, according to a further embodiment of the method according to the application, a maximum measurement frequency of the measuring pulse string can be at most 10 Hz (during the measuring time period), preferably at most 8 Hz, particularly preferably at most 6 Hz. The measuring frequency may be between 1 Hz and 10 Hz during the measuring time period, preferably between 2 Hz and 8 Hz, particularly preferably between 3 Hz and 7 Hz.

For a particularly accurate and at the same time effective evaluation, according to a further embodiment of the method according to the application, the measuring time period can be between 0.5 minutes and 20 minutes, preferably between 1.5 minutes and 15 minutes, particularly preferably between 2.5 minutes and 7.5 minutes. The measuring time period can at least depend on the soil type (as well as the insertion time period).

According to a particularly preferred embodiment of the method according to the application, the inserted pile cannot be applied with pulses and vibrations, respectively, by the vibrator device for a (predeterminable) (first) fixed growth time period before the inserted pile is applied with the measuring pulse string. During the first fixed growth time period, the pile is therefore in particular vibration-free.

For a particularly accurate assessment, it is preferably possible to wait after inserting the pile to a specified anchoring depth until it is ensured that the soil has settled respectively calmed down (sufficiently). The first fixed growth time period thus represents in particular the time period during which no pulses are transmitted to the pile by the vibrator device. In particular, the first fixed growth time period is selected in such a way that the built-up excess pore water pressure of the soil has settled at least to a large extent to the original value (i.e., before the installation of the pile).

Particularly preferably, the fixed growth time period can be determined depending on the soil type (in particular underwater bottom type) at the installation site of the pile, wherein the (first) fixed growth time period can in particular be between 10 minutes and one week, preferably between one hour and one day. Said second fixed growth time period may in particular be shorter than the first fixed growth time period and may, for example, be between 1 minute and 10 minutes.

According to a further embodiment of the method according to the application, the method may further comprise:
- releasing, after the pile has been inserted to a specified anchoring depth, of a force-fit connection between the vibrator device and the pile,
- maintaining the released force-fit connection between the vibrator device and the pile during a fixed growth time period,
- wherein applying a measuring pulse string to the inserted pile during at least one vibration time period comprises re-establishing the force-fit connection between the vibrator device and the pile during the vibration time period.

When the force-fit connection is released, no (more) pulses are transmitted from the vibrator device to the pile (even if the vibrator device continues to generate vibrations/oscillations). A shutdown and restart of the vibrator device can be omitted.

In addition, preferably, a pre-described detecting can be performed immediately after the release of the force-fit connection.

Furthermore, it can be assumed that for an evaluation of the detected motion data, a performance of the so-called cavitative vibration ramming for an unambiguous identification of the downward motion data by the determination module is advantageous. Therefore, according to a preferred embodiment, the cavitative vibration ramming is performed.

A further aspect of the application is a measuring system, in particular configured to assess the (axial) load bearing capacity of an inserted pile. The measuring system comprises at least one control module configured to control a vibrator device arranged at an inserted pile in such a way that the vibrator device applies the inserted pile with a measuring pulse string during at least one vibration time period. The measurement system comprises at least one detection module configured to detect motion data of the inserted pile caused by the measuring pulse string during a measuring time period. The measurement system comprises at least one determination module configured to determine at least one downward motion data set from the detected motion data. The measuring system comprises at least one evaluation module configured to evaluate the downward motion data set in such a way that a load bearing capacity criterion is determined (in particular based on at least one verification criterion).

In particular, the measurement system can be carried out by the method described above.

The control module, the detection module, the determination module and the evaluation module may preferably be integrated in a measuring device comprising at least one processor. For example, a computer can form the measuring device.

The control module is configured to control the vibrator device. The detection module can in particular be connected to at least one motion data sensor. The at least one motion data sensor provides in particular a (continuous) sensor signal, which can be sampled and recorded by the detection module in particular in the manner described above.

Subsequently, the motion data detected in this way can be further processed by the determination module in the manner described above. In particular, the determination module can comprise a (previously described) filter function and apply it to the detected motion data. This processed motion data can be evaluated by the evaluation module in the manner described above.

According to a further embodiment of the measurement system according to the application, the measurement system can comprise at least one vibrator device that is connectable to a pile in a force-fit manner. In particular, a local controller of the vibrator device may be connectable to the control module of the measurement system via a (wired and/or wireless) communication network. The control module may control the local controller via the communication network. In particular, the control module can send a command data set containing control commands, such as maximum measurement frequency, vibration time period, start time, end time, and/or the like.

Further, according to a further embodiment, the measurement system may comprise at least one motion data sensor. For example, the measurement system may comprise at least one motion data sensor and/or be connected to at least one motion data sensor. In a preferred embodiment, the measurement system may comprise at least one (preferably exactly two) strain sensor(s) and/or at least one (preferably exactly two) acceleration sensor(s). The at least one motion data sensor may be attached to the pile head according to one embodiment of the measurement system.

Alternatively or additionally, according to a further embodiment of the measuring system, at least one motion data sensor may be arranged at the vibrator device. According to the application, it has been recognized that due to the force-fit connection and coupling, respectively, between the vibrator device and the pile, the motion data can also be measured at the vibrator device. Moreover, the vibrator device is always connected to the pile head during the vibration period in a force-fit manner. By having the at least one motion data sensor, preferably all motion data sensors, (fixedly) arranged at the vibrator device, the effort in assessing the load bearing capacity can be significantly reduced. In particular, the time-consuming attachment (and subsequent removal) of the at least one motion data sensor to the pile head can be eliminated.

A further aspect of the application is a vibrator device for inserting a pile into a soil. The vibrator device comprises at least one attachment module configured to attach the vibrator device to the pile (head) in a force-fit manner. The vibrator device comprises at least one motion data sensor arranged at the vibrator device (as has been described in particular before).

In particular, the vibrator device may be a part of the measurement system described above and/or may be used by the measurement system described above to perform the loadbearing capacity assessment.

A still further aspect of the application is a computer program product having instructions (and software code, respectively) executable on a processor (in particular, a previously described measurement device), wherein the instructions are adapted to cause the processor to perform the following steps:
- controlling a vibrator device arranged at an inserted pile in such a way that the vibrator device applies a measuring pulse string to the inserted pile during at least one vibration time period,
- detecting of motion data of the inserted pile caused by the measuring pulse string during a measuring time period,
- determining at least one downward motion data set from the detected motion data; and evaluating the downward motion data set such that a load bearing criterion is determined (in particular based on at least one verification criterion).

The computer program product, in particular the instructions respectively program instructions, may be stored in a computer program memory, in particular a program memory. For example, a program memory is a non-volatile memory such as a flash memory, a magnetic memory, an EEPROM memory (electrically erasable programmable read-only memory), and/or an optical memory.

In addition, a measuring device may have a main memory, for example a volatile or non-volatile memory, in particular a random access memory (RAM), such as a static RAM memory (SRAM), a dynamic RAM memory (DRAM), a ferroelectric RAM memory (FeRAM) and/or a magnetic RAM memory (MRAM). For example, the processor of the measurement device may store intermediate results or the like in the main memory.

In particular, the computer program product may comprise a plurality of software modules, in particular at least one pre-described control module, one pre-described detection module, one pre-described determination module, and one pre-described evaluation module.

A still further aspect of the application is a measurement set comprising at least one vibrator device (e.g., comprising at least one motion data sensor attached to the vibrator device) and at least one measurement device having at least one processor, adapted to execute the computer program product described previously.

A device, a module or a device can be formed at least partially from software and/or at least partially from hardware. In particular, a device/element may comprise suitable computing elements (e.g., processor, memory, etc.). Furthermore, it should be noted that terms such as "first", "second" do not indicate any order, but only serve to distinguish elements, such as the fixed growth period.

The features of the methods, measuring systems, vibrator devices, computer program products and measuring sets can be freely combined with each other. In particular, features of the description and/or of the dependent claims may be independently inventive, even by completely or partially circumventing features of the independent claims, alone or freely combined with each other.

BRIEF DESCRIPTION OF THE DRAWINGS

There is now a plurality of possibilities to design and further develop the method according to the application, the measuring system according to the application, the vibrator device according to the application, the computer program product according to the application and the measuring set according to the application. For this purpose, reference is made on the one hand to the claims subordinate to the independent claims, and on the other hand to the description of embodiments in connection with the drawing. In the drawing shows:

DETAILED DESCRIPTION

In the following, similar reference signs are used for similar elements. Furthermore, in the following z denotes the vertical axis and direction, respectively, and x a horizontal axis and direction, respectively.

Figure 1:
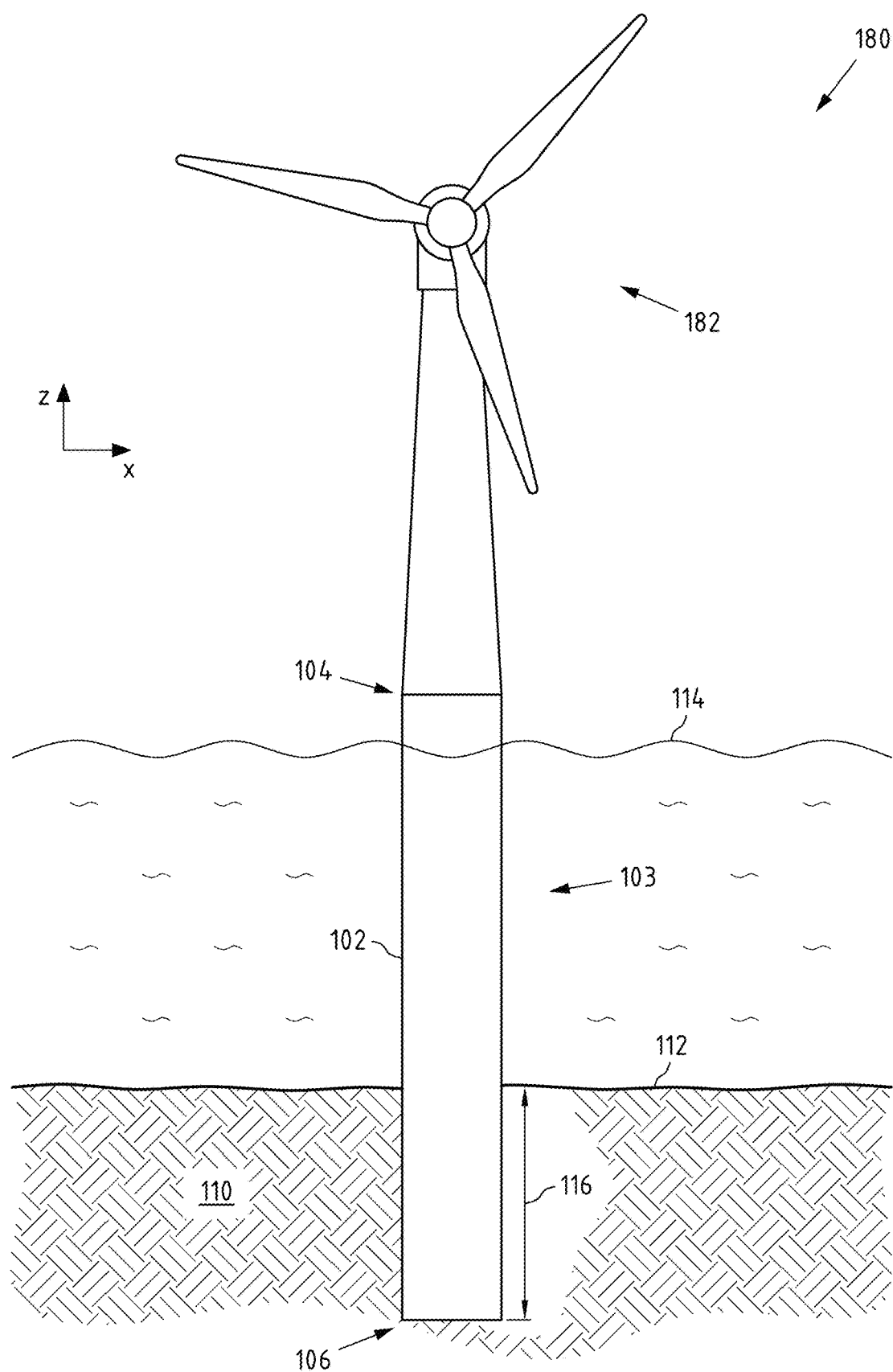
FIG. 1 is a schematic view of an example of an offshore structure with an inserted pile.

FIG. 1 shows a schematic view of an example of an offshore structure 180 with an inserted pile 102. In the example shown, the installed pile 102 forms the foundation 103 of the offshore structure 180.

In particular, the offshore structure 180 is formed by the foundation 103 and an offshore device 182. As can be seen from FIG. 1, the offshore structure 180 in the present case is an offshore wind turbine 180.

In particular, the offshore wind turbine 180 is a conventional wind turbine 180. As an offshore device 182, the wind turbine 180 has a tower and a nacelle arranged on the tower. With the aid of an inverter, the wind energy is converted into electrical energy. This is fed into an internal wind farm grid via a transformer and an electrical connection. For example, an offshore substation of a wind farm can feed the generated electrical energy into an onshore distribution grid.

The pile 102 may be formed of steel and/or concrete. Preferably, the pile 102 may comprise a circumferential pile wall. The pile 102 comprises an upper pile end 104 (in the shown installed respectively inserted condition), also referred to as the pile head 104, and a lower pile end 106, also referred to as the pile base 106.

The reference sign 114 indicates the water surface, the reference sign 112 indicates the soil surface (in this case a seabed surface) and the reference sign 110 indicates the soil (in this case a seabed). As can be seen, an "inserted pile 102" means that the pile 102 is inserted in the soil 110 with a certain anchoring depth 116 (from the soil surface 112 to the pile base 106).

The method described in more detail below serves to determine whether the inserted pile has sufficient (axial) load bearing capacity. The method according to the application can be carried out in particular after the pile has been inserted in the soil and before the installation of the offshore device.

Figure 2:
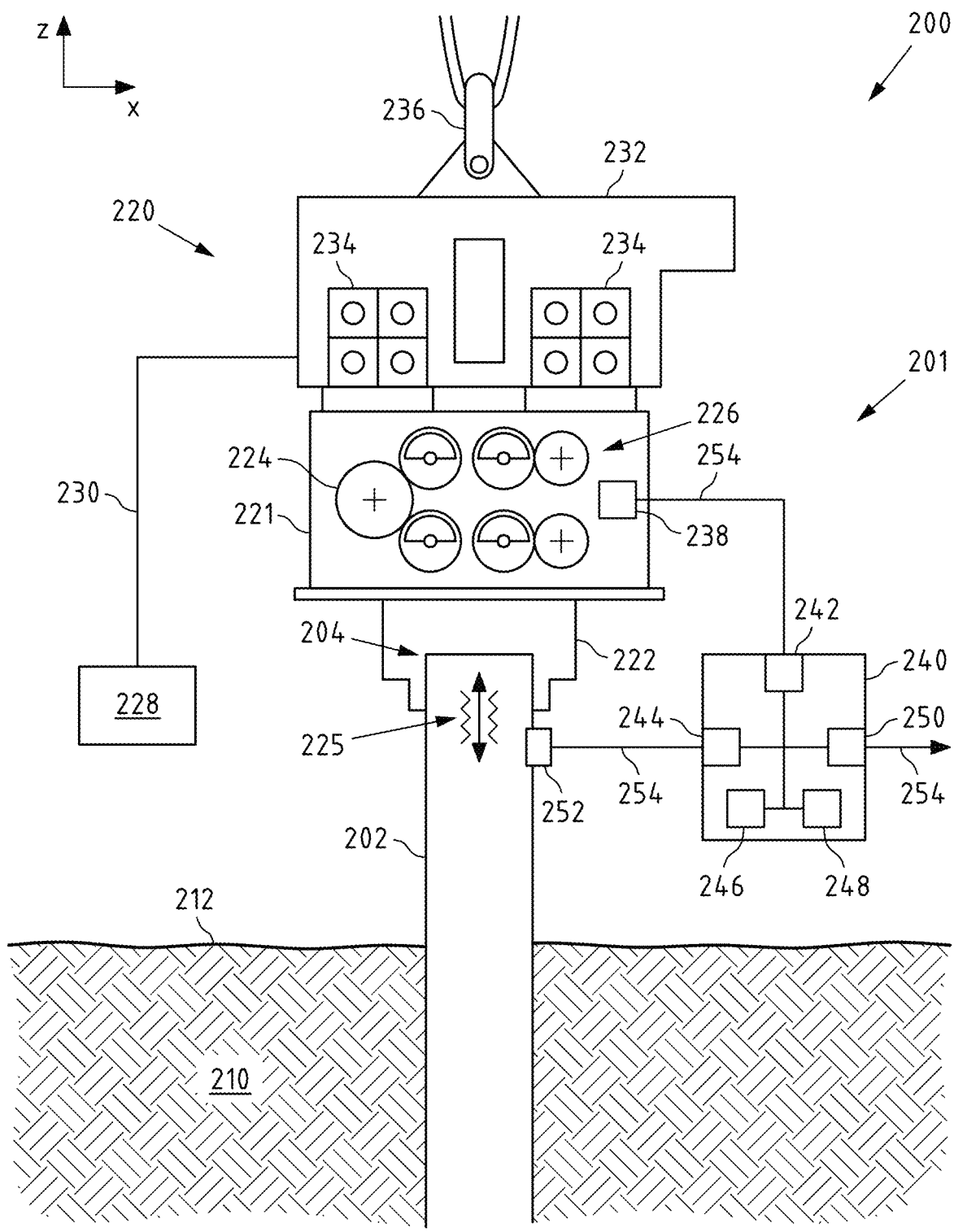
FIG. 2 is a schematic view of an embodiment of a measuring system according to the present application.

FIG. 2 shows a schematic view of an embodiment of a measuring system 200 according to the present application. In one embodiment, the measuring system 200 may be formed by only an measuring device 240. In particular, the measuring device 240 may be formed by a computer device 240 comprising at least one processor to execute a computer program product. In particular, the computer program product may be formed by modules 242, 244, 246, and 248.

The measuring device 240 comprises at least one control module 242 configured to control a vibrator device 220 arranged at an inserted pile 202 in such a way that the vibrator device 220 applies a measuring pulse string to the inserted pile 202 during at least one vibration time period, a detection module 244 configured to detect motion data of the inserted pile 202 caused by the measuring pulse string during a measuring time period, a determination module 246 configured to determine at least one downward motion data set from the detected motion data, and an evaluation module 248 configured to evaluate the downward motion data set in such a way that a load bearing capacity criterion is determined (in particular based on at least one verification criterion).

Said modules 242, 244, 246, and 248 may preferably be formed as software modules executable by the processor of the measurement device 240.

Further, a measurement device 240 may comprise an output module 250 configured to output the evaluation result, such as an assessment of whether or not the inserted pile has sufficient load bearing capacity.

As can be seen, at least one (wireless and/or wired) communication network 254 may be provided for a communication of the measurement device 240 with other components, such as of the vibrator device 220.

In the present embodiment, the measuring system 200 (additionally) comprises a vibrator device 220. The vibrator device 220 is configured to generate oscillations/vibrations in the form of a measuring pulse string with a specific (maximum) measuring frequency at least during a vibration time period. Preferably, the vibrator device 220 can also be used for inserting the pile 202 into the soil with a inserting frequency that is in particular greater than the measuring frequency.

The vibrator device 220 shown here as an example is arranged at the pile 202, in particular the pile head 204, by means of an attachment module 222. In particular, the attachment module 222 can be used to create a (temporary) force-fit connection between the vibrator device 220 and the pile 202.

Furthermore, the vibrator device 220 comprises a first base body 221 (also called excitor block) and a second base body 232 (also called suppressor housing) connected to the first base body 221 by means of elastic damping elements 234. While the first base body 221 also experiences the vibrations, the second base body 232 is substantially decoupled therefrom by the damping elements 234. A suspension 236, for example for a crane device, is provided on the second base body 232.

An eccentric device 226 is arranged in the first base body 221, the eccentric device 226 comprising a plurality of eccentric masses. The eccentric device 226 comprises a motor 224 for driving the eccentric masses. Power is supplied to the motor 224 by means of a power supply 228 and generator 228, respectively, which is connected to the second base body 232 by means of a power line 230. The motor can be supplied with energy by means of a further line not shown.

The eccentric masses, which are arranged in particular in pairs, preferably rotate at the same angular speed but in opposite directions. The at least two eccentrics and eccentric masses, respectively, can generate centrifugal forces. Here, the horizontal forces can cancel each other, while the vertical components can add up to a total centrifugal force, so that vibrations are generated in the vertical direction, i.e., in the direction of the longitudinal axis of the pile 202 (indicated by the arrow 225). The pulses and oscillations, respectively, generated thereby can be transmitted to the pile due to the force-fit connection, thus generating a plurality of strain waves and pulse waves, respectively.

In order to control the motor 224, the vibrator device 220 may comprise a local controller 238. In particular, this controller may control the motor 224 of the vibrator device 220 according to control commands received from the control module 242.

As can be further seen, at least one motion data sensor 252 may be provided. In particular, the measurement system 200 may comprise the at least one motion data sensor 252. In particular, the motion data sensor 252 is configured to (continuously) measure motion data of the pile 202. For this purpose, the motion data sensor 252 (in particular a strain sensor and/or an acceleration sensor) may be attached to the pile head (in a force-fit manner). Preferably, two strain transducers and two acceleration transducers may be provided.

Figure 3:
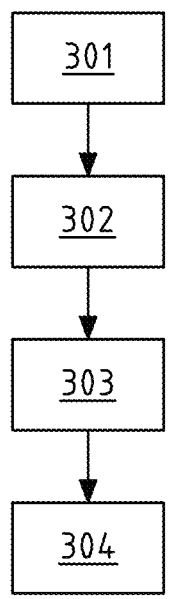
FIG. 3 is a diagram of an embodiment of a method according to the present application.

The operation of the measuring system 200 is described in more detail below with the aid of FIG. 3. FIG. 3 shows a diagram of an embodiment of a method according to the present application for assessing the load bearing capacity of an inserted pile 202.

In a first step 301, an applying is performed, by the vibrator device 220 arranged at the inserted pile 202 (in a force-fit manner), of a measuring pulse string to the inserted pile 202 during at least one vibration time period. In particular, a control module 242 may transmit a command data set (containing, for example, start time point, vibration time period, measuring time period, end time point, and/or maximum measuring frequency) to the local controller 238. This results in particular in a controlling of the vibrator device 220 arranged at the inserted pile 202 in such a way that the inserted pile 202 is applied with a measuring pulse string by the vibrator device 220 during at least one vibration time period.

In a further step 302 (which is carried out in particular in parallel with step 301), a detecting is carried out, by at least one detection module 244, of motion data of the inserted pile caused by the measuring pulse string during a measuring time period. Preferably, the acceleration and the compression of pulse waves on the pile 202 can be measured as motion data by preferably a plurality of corresponding motion data sensors 252. The measurement signals are provided to the detection module 244, which in particular detects the motion data at a sampling rate of, for example, at least 10,000 values per second.

The measuring time period is in particular within the vibration time period.

In step 303, a determining is performed of at least one downward motion data set from the detected motion data. In particular, the determination module 246 applies a previously described filter function to the detected motion data. Through this, the motion data and pulse wave data, respectively, associated with a downward motion of the vibrator device 220 can be determined. In particular, this motion data forms the at least one downward motion data set.

Then, in step 304, an evaluating is performed, by an evaluation module 348, of the at least downward motion data set such that a load bearing capacity criterion is determined, in particular based on at least one verification criterion.

The evaluating of the at least one downward motion data set may, according to a preferred embodiment, be performed by means of modeling based on the wave theory, e.g., based on the CAPWAP method, TNOWAVE method or CASE method (these methods are known to the skilled person).

For example, a pile-soil model (CAPWAP) can be developed by inverse system identification using the at least one downward motion data set (and signals, respectively), from which the static pile resistances (preferably shell friction and/or peak pressure) can then be derived to determine whether there is (or is not) sufficient (axial) load bearing capacity of the inserted pile.

The verification criterion can be a specified limit load bearing capacity, which must be complied with in order for an inserted pile to be evaluated as a pile 202 with a sufficient (axial) load bearing capacity. Thus, if the criterion is not met, the axial load bearing capacity is not sufficient. For example, further measures can then be taken (for example, the pile 202 can be inserted deeper) and, if necessary, the present method can be carried out again.

As an example, the analysis/evaluation is described in more detail on the basis of the CAPWAP method (model analysis), which is generally known to the person skilled in the art. The CAPWAP (Case Pile Wave Analysis Program) is a so-called signal matching program. The method assumes that the force introduced by the vibrator device through a downward motion and its response is known (from wave up and wave down curves). The determination of this motion data is performed in step 303, as described.

Not known in this method, however, is initially the static and dynamic soil model. This is determined in the evaluation. In particular, the following steps are performed in the evaluation in step 304:

Create a pile model and make an initial assumption for shell friction and base friction.

The determined and previously measured data of compression and/or acceleration are used as a basis for the calculation of the associated force.

Then the calculated force is compared with the measured force.

Based on the comparison result, the shell friction and the base friction are adjusted.

Steps 2. to 4. are repeated in particular until a sufficient match is achieved in step 3.

Then, as described, a verification criterion can be used to determine whether or not the installed pile 202 has sufficient axial load bearing capacity.

Figure 4:
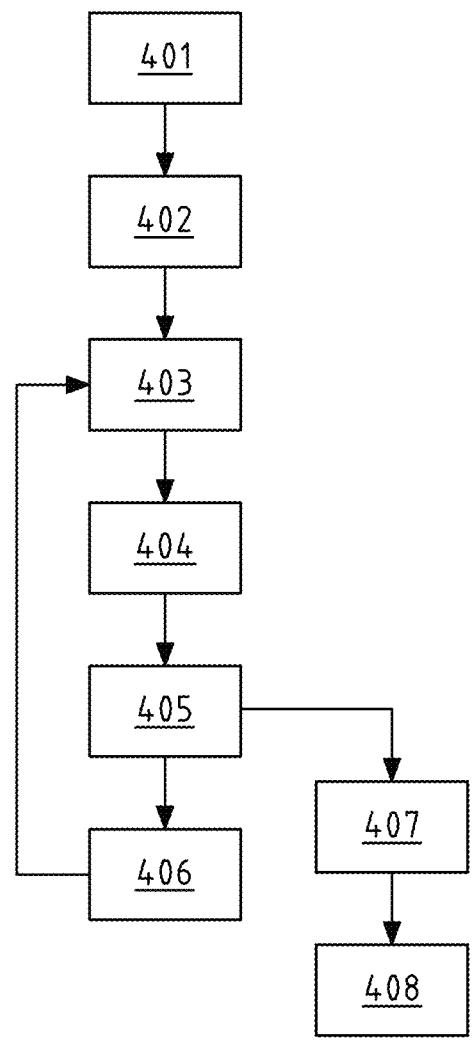
FIG. 4 is a diagram of a further embodiment of a method according to the present application.

FIG. 4 shows a diagram of a further embodiment of a method according to the present application. In order to avoid repetitions, essentially only the differences from the previous embodiment are described below. The method according to FIG. 4 comprises in particular an installation method.

In a first step 401, a pile is inserted at a specific installation location. In particular, the pile is driven into the ground by a vibrator device attached to the pile head in a force-fit manner, in particular to a certain anchoring depth.

After inserting the pile and before applying the measuring pulse string to the inserted pile (step 403), the inserted pile cannot be applied with pulses and vibrations, respectively, by the vibrator device in step 402 for a (predefinable) first fixed growth time period. For a particularly accurate assessment, it is preferable to wait after an insertion of the pile to the specified anchoring depth before applying vibrations for the measurement until it has been ensured that the soil around the pile has settled (sufficiently). The first fixed growth time period thus represents in particular the time period during which no pulses are transmitted to the pile by the vibrator device.

Particularly preferably, the fixed growth time period can be determined depending on the soil type (in particular underwater bottom type) at the installation site of the pile, wherein the first fixed growth time period can in particular be between 10 minutes and one week, preferably between one hour and one day.

After the first fixed growth time period has elapsed, in step 403, the pile is applied with vibrations in the form of the measuring pulse string as described in step 301.

In step 404, motion data of the inserted pile caused by the measuring pulse string is detected during a measuring time period, as described in particular in step 302.

The maximum measuring frequency of the measuring pulse string during the measuring time period can preferably be at least below a specified limit frequency. In particular, the limit frequency can be selected in such a way that it is ensured that the soil at the installation site does not (re) liquefy and thus the pile sinks deeper.

Particularly preferably, a maximum measuring frequency of the measuring pulse string (during the measuring time period) can be at most 80% of the insertion frequency, preferably at most 60% of the insertion frequency, particularly preferably at most 40% of the inserting frequency. In particular, the inserting frequency means the frequency (which is maximum during inserting) at which the pile was inserted into the certain anchoring depth in step 401. It should be noted here that the inserting frequency depends in particular on the soil type at the installation location of the pile. In a corresponding manner, the maximum measuring frequency therefore depends on the soil type.

Furthermore, a maximum measurement frequency of the measuring pulse string can be at most 10 Hz during the measuring time period, preferably at most 8 Hz, particularly preferably at most 6 Hz. The measuring frequency can be between 1 Hz and 10 Hz during the measuring time period, preferably between 2 Hz and 8 Hz, particularly preferably between 3 Hz and 7 Hz.

For a particularly accurate and at the same time effective evaluation, the measuring time period can be between 0.5 minutes and 20 minutes, preferably between 2.5 minutes and 15 minutes, particularly preferably between 2.5 minutes and 7.5 minutes. The measuring time period can at least depend on the soil type (as well as the application time period).

In step 405, a determining of at least one downward motion data set from the detected motion data is performed as described in step 303.

In the present embodiment, after the detecting (and the determining which may be performed in parallel with the detecting), i.e., in particular after the measuring time period and after a decay time period, a step 406 is performed in which the pile is not applied with vibrations.

After this second fixed growth time period, which can in particular be shorter than the first fixed growth time period, the (previously described) steps of applying (403), detecting (404) and determining (405) can be carried out again. In particular, this test procedure, i.e., applying (403), detecting (404) and determining (405), can be carried out several times, in each case interrupted by at least said decay time period and the second fixed growth time period.

Said second fixed growth time period may, in particular, be shorter than the first fixed growth time period and may be between 1 minute and 10 minutes, for example.

Subsequently, a (joint) evaluating in step 407 (cf. step 304) of the respective determined downward motion data sets can be performed. A more precise evaluation can be carried out by means of appropriate testing.

The assessment result can then be output in step 408 and presented to a user by means of a display, for example.

In another embodiment (not shown), the following steps may be provided after step 401:

releasing, after the pile has been inserted to a specified anchoring depth, of a force-fit connection between the vibrator device and the pile, maintaining the released force-fit connection between the vibrator device and the pile during a fixed growth time period, wherein applying a measuring pulse string to the inserted pile during at least one vibration time period comprises re-establishing the force-fit connection between the vibrator device and the pile during the vibration time period.

Figure 5:
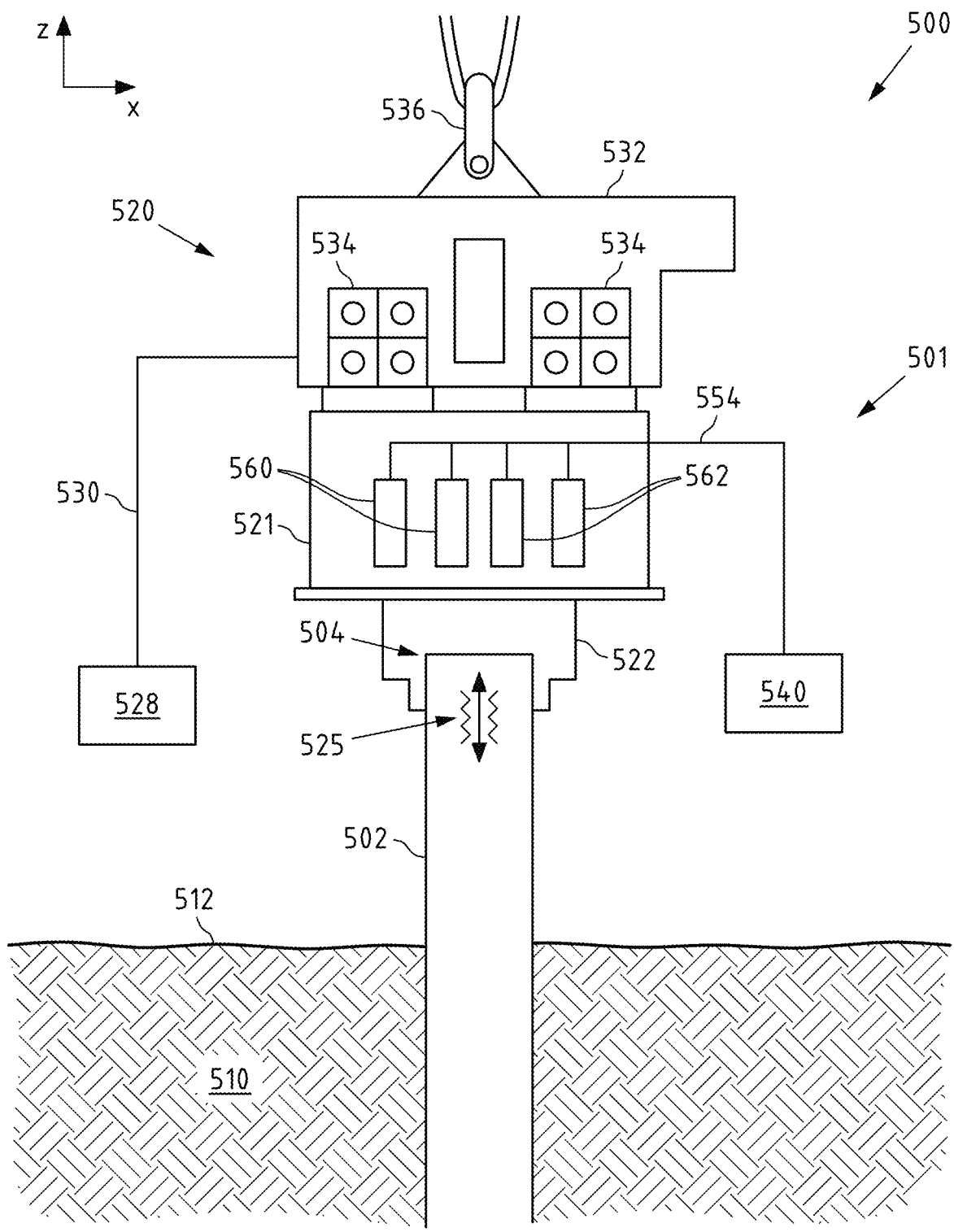
FIG. 5 is a schematic view of an embodiment of a vibrator device according to the present application.

FIG. 5 shows a schematic view of an embodiment of a vibrator device 520 according to the present application. In order to avoid repetitions, essentially only the differences from the embodiment of a vibrator device 220 according to FIG. 2 are described below.

The main difference is that the motion data sensors 560, 562 (in particular two strain sensors 560 and two accelerometers 562) are attached (permanently and in particular non-detachably) to the vibrator device 520. For example, the at least one motion data sensor 560, 562 may be attached to the exterior of the vibrator device 520.

As can be seen from FIG. 5, the at least one motion data sensor 560, 562 is attached to a portion 521 of the vibrator device 520 that also experiences the vibrations (nearly undamped). Exemplarily, the at least one motion data sensor 560, 562 is attached to the first base body 521 that comprises the eccentric device 526. By means of the at least one attachment module 522, which can be connected to a pile in a force-fit manner, the generated oscillations and vibrations, respectively, are transmitted to the pile, in particular in the form of the measuring pulse string. In a corresponding manner, the pulse waves reflected by the pile base can be transmitted to the vibrator device 520, in particular the attachment module 522 and the first base body 521, and measured by the at least one motion data sensor 560, 562.

In other variants of the application, the at least one motion data sensor may alternatively or additionally be mounted in a different position, such as on the attachment module.

A measuring device 540 may be communicatively connected to the at least one motion data sensor 560, 562. In variants of the application, the measuring device may also be arranged at and/or comprised by the vibrator device and, for example, transmit the at least one evaluation result to at least one user terminal.

According to the application, a pile can be inserted into the soil to a certain final/target depth by means of a vibrator/vibrator device, which can be associated with switching off the vibration system.

During the last few centimeters of the penetration process, motion data from the motion data sensors (preferably strain and/or acceleration) attached to the pile, for example, can be recorded using data loggers. This process is known as "End of Driving" and characterizes in particular the EoD-value. Subsequently, the method according to the application is carried out, which can also be referred to as a dynamic vibro-restrike test. In particular, the method can be as follows (as also described earlier):

Wait until the soil has "settled down" or become firmly established, i.e., the built-up excess pore water pressure has at least largely settled to the original (i.e., before insertion of the pile) value. Depending on the soil conditions, the period/fixed growth period can range from a few minutes to several hours or even days. However, it is always possible to carry out the vibro-restrike test prematurely, but the results must then be evaluated accordingly.

Afterwards, the vibrator/vibrator device is moved briefly onto the pile for a few seconds or even a few minutes while the motion data sensors attached to the pile record the motion data by means of a logger/recording module. A significant (further) sinking of the pile is not to be expected here and can be prevented, if necessary, by stopping the vibrator in time.

The process described above can be repeated after several days up to several weeks in order to determine and, in particular, prove a possible growth effect of the pile.

The vibration frequency can typically range from about 10 to 25 Hz when driving offshore piles. In particular, this inserting frequency can depend on the penetration depth and the condition and/or type of soil. When the vibrator is restarted, i.e., when a measuring pulse string is applied to the pile (in order to perform the vibro-restrike test), this can be done in such a way that the maximum measuring frequency is (significantly) lower than in the continuous process. Here, reduced values of the system frequency of preferably more than 40% are conceivable.

Furthermore, it can be assumed that for an evaluation of the detected motion data, a performance of the so-called cavitative vibration ramming for an unambiguous identification of the downward motion data by the determination module is advantageous. Therefore, according to a preferred embodiment, the cavitative vibration ramming is performed.

Figure 6:
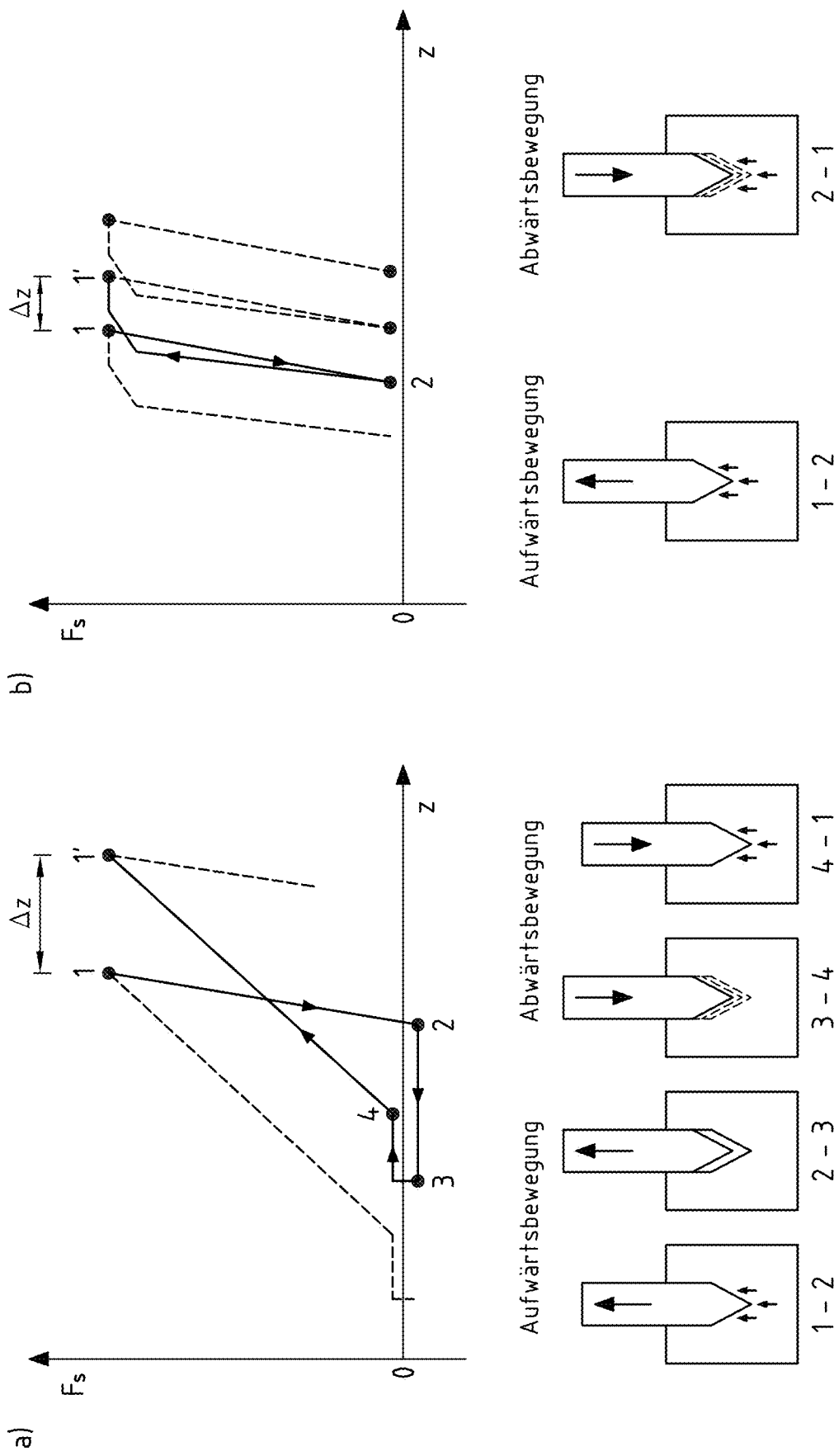
FIG. 6 is a schematic view illustrating the difference between so-called cavitative vibratory pile driving and non-cavitative vibratory pile driving.

As can be seen from FIG. 6, in contrast to non-cavitating vibratory driving (FIG. 6b), there is a loss of contact in cavitating vibratory driving (FIG. 6a) between the soil and the pile during upward motion. This finding can be used in the filter function so that the desired motion data of a downward pulse can be determined/identified with higher accuracy.

By means of a vibrator/vibratory device, piles can be driven quickly and quietly into the soil. In particular, the vibrator generates a rapid sequence of upward and downward movements (oscillations and pulse strings, respectively) by means of at least two rotating imbalances, during which the soil is partly converted into a liquefied state.

With this method, the force as well as the speed of the penetration process at the pile head can be recorded at a high sampling rate at the vibrated pile. The high sampling rate enables individual downward movements to be clearly identified with sufficient measured values. The evaluation of this determined motion data is carried out in particular by means of complete modeling based on the wave theory (e.g., CAPWAP or TNOWAVE method).

As a result, the resistance-settlement line and/or the distribution of pile shell and pile base resistance can be determined. If necessary, disturbing influences of the upward movement can be eliminated by calculation (e.g., by the filter function). So that the pile resistance can also be recorded after the installation process, the vibrator can be restarted at least once after a time to be specified and the resistance of the downward movement of the pile can be recorded metrologically in the "calmed" soil. The actual load bearing capacity of the pile can thus be determined at the selected time.

All references, including publications, patent applications, and patents cited herein are hereby incorporated by reference to the same extent as if each reference were individually and specifically indicated to be incorporated by reference and were set forth in its entirety herein.

It should be understood that the figures illustrate exemplary embodiments in detail, and it should be understood that the present application is not limited to the details or methodology set forth in the description or illustrated in the figures. It should also be understood that the terminology is for purpose of description only and should not be regarded as limiting.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for assessing the load bearing capacity of an inserted pile, comprising:
   inserting the pile by a vibrator device with a maximum inserting frequency,
   applying, by the vibrator device arranged at the inserted pile, after the insertion of the pile the inserted pile with a measuring pulse string during at least one vibration time period, wherein a maximum measuring frequency of the measuring pulse string is at most 80% of the maximum inserting frequency,
   detecting, by at least one detection module, motion data of the inserted pile caused by the measuring pulse string during a measuring time period,
   determining at least one downward motion data set from the detected motion data; and
   evaluating the downward motion data set such that a load bearing capacity criterion is determined.

2. The method according to claim 1, wherein the motion data is detected at a sampling rate of at least 10,000 values per second.

3. The method according to claim 2, wherein the motion data is detected at a sampling rate of at least 40,000 values per second.

4. The method according to claim 1, wherein the maximum measuring frequency of the measuring pulse string is at least below a limit frequency.

5. The method according to claim 1, wherein the maximum measuring frequency of the measuring pulse string is at most 60% of the inserting frequency.

6. The method according to claim 5, wherein the maximum measuring frequency of the measuring pulse string is at most 40% of the inserting frequency.

7. The method according to claim 1, wherein the maximum measuring frequency of the measuring pulse string is at most 10 Hz.

8. The method according to claim 7, wherein the maximum measuring frequency of the measuring pulse string is at most 8 Hz.

9. The method according to claim 8, wherein the maximum measuring frequency of the measuring pulse string is most 6 Hz.

10. The method according to claim 1, wherein the measuring time period is between 0.5 minutes and 20 minutes.

11. The method according to claim 10, wherein the measuring time period is between 1.5 minutes and 15 minutes.

12. The method according to claim 11, wherein the measuring time period is between 2.5 minutes and 7.5 minutes.

13. The method according to claim 1, wherein before applying the measuring pulse string to the inserted pile for a fixed growth time period, the inserted pile is not applied with pulses by the vibrator device.

14. The method according to claim 13, wherein the fixed growth time period is determined depending on the underwater soil type at the installation site of the pile.

15. The method according to claim 14, wherein the fixed growth time period is between 10 minutes and one week.

16. The method according to claim 15, wherein the fixed growth time period is between one hour and one day.

17. The method according to claim 1, wherein the method further comprises:
   releasing, after inserting of the pile to a specified anchoring depth, a force-fit connection between the vibrator device and the pile,
   maintaining the released force-fit connection between the vibrator device and the pile during a fixed growth time period,
   wherein applying a measuring pulse string to the inserted pile during at least one vibration time period comprises re-establishing the force-fit connection between the vibrator device and the pile during the vibration time period.

18. A measuring system, comprising:
   a vibrator device configured to insert a pile with a maximum inserting frequency,
   at least one control module configured to control the vibrator device arranged at the inserted pile in such a way that the inserted pile is applied with a measuring pulse string by the vibrator device during at least one vibration time period, wherein a maximum measurement frequency of the measuring pulse string is at most 80% of the maximum inserting frequency,
   at least one detection module configured to detect motion data of the inserted pile caused by the measuring pulse string during a measuring time period,
   at least one determination module configured to determine at least one downward motion data set from the detected motion data, and
   at least one evaluation module configured to evaluate the downward motion data set such that a load bearing capacity criterion is determined.

19. The measuring system according to claim 18, wherein the measuring system comprises at least one vibrator device that is connectable to a pile in a force-fit manner, wherein at least one motion data sensor is arranged at the vibrator device.

20. A computer program product having instructions executable on a processor, wherein the instructions are adapted to cause the processor to perform the following steps:
  controlling a vibrator device for inserting a pile with a maximum inserting frequency
  controlling the vibrator device arranged at the inserted pile in such a way that the vibrator device applies a measuring pulse string to the inserted pile during at least one vibration time period, wherein a maximum measurement frequency of the measuring pulse string is at most 80% of the maximum inserting frequency,
  detecting motion data of the inserted pile caused by the measuring pulse string during a measuring time period,
  determining at least one downward motion data set from the detected motion data; and
  evaluating the downward motion data set such that a load bearing capacity criterion is determined.

* * * * *